US009803667B2

(12) United States Patent
Brock et al.

(10) Patent No.: US 9,803,667 B2
(45) Date of Patent: Oct. 31, 2017

(54) VORTEX FLOW APPARATUS

(71) Applicant: VTX TECHNOLOGY LLC, Troy, MI (US)

(72) Inventors: John L. Brock, Auburn, MI (US); Lynn L. Faulkner, Westerville, OH (US); David H. Hill, San Diego, CA (US)

(73) Assignee: VTX TECHNOLOGY LLC, Troy, MI (US)

( * ) Notice: Subject to any disclaimer, the term of this patent is extended or adjusted under 35 U.S.C. 154(b) by 313 days.

(21) Appl. No.: 14/713,036

(22) Filed: May 15, 2015

(65) Prior Publication Data

US 2015/0330422 A1 Nov. 19, 2015

Related U.S. Application Data

(60) Provisional application No. 61/993,702, filed on May 15, 2014.

(51) Int. Cl.

| | |
|---|---|
| ***B01D 50/00*** | (2006.01) |
| ***F15D 1/00*** | (2006.01) |
| ***F01N 1/08*** | (2006.01) |
| ***F02M 26/35*** | (2016.01) |

(52) U.S. Cl.

CPC ............. *F15D 1/009* (2013.01); *F01N 1/085* (2013.01); *F01N 1/086* (2013.01); *F01N 1/087* (2013.01); *F01N 1/089* (2013.01); *F02M 26/35* (2016.02); *F15D 1/0015* (2013.01); *F01N 2470/18* (2013.01); *F01N 2490/08* (2013.01); *Y10T 137/2104* (2015.04)

(58) Field of Classification Search

CPC . F01N 1/089; F01N 1/088; F01N 1/04; F01N 1/02; F01N 1/084; F01N 3/28

USPC ................ 422/177; 181/274, 275, 212, 265; 60/274

See application file for complete search history.

(56) References Cited

U.S. PATENT DOCUMENTS

| | | | | |
|---|---|---|---|---|
| 2,239,549 | A | 4/1941 | Chipley | |
| 2,841,235 | A | 7/1958 | Curioni | |
| 3,754,620 | A * | 8/1973 | Foster ..................... | F01N 1/084 181/265 |
| 3,802,570 | A | 4/1974 | Dehne | |
| 3,815,338 | A | 6/1974 | Lenane | |
| 3,917,568 | A | 11/1975 | Klein et al. | |
| 4,011,922 | A | 3/1977 | Goplen | |
| 4,094,645 | A | 6/1978 | Bailey | |

(Continued)

FOREIGN PATENT DOCUMENTS

WO WO2014085581 A1 6/2014

*Primary Examiner* — Tom P Duong

(74) *Attorney, Agent, or Firm* — Brooks Kushman P.C.

(57) ABSTRACT

A vortex flow apparatus including a cylindrical housing that contains a fluid that flows in a swirling circular path. The apparatus may be utilized as a muffler for a combustion engine, a particle separator, or an energy conversion device that physically or chemically acts upon the fluid flow and particles contained within the apparatus. The housing defines an inlet opening that opens into the first end of the housing proximate a first end wall. An outlet tube defines an outlet opening through a first end wall. A projection is attached to a second end wall of the housing and extends into the housing. The outlet tube and projection are aligned with and centered relative to a central axis.

4 Claims, 10 Drawing Sheets

(56) References Cited

U.S. PATENT DOCUMENTS

| | | | | |
|---|---|---|---|---|
| 4,220,219 | A * | 9/1980 | Flugger | F01N 1/04 181/265 |
| 5,294,410 | A | 3/1994 | White | |
| 6,467,570 | B1 * | 10/2002 | Herold | F01N 1/02 181/212 |
| 7,490,467 | B2 * | 2/2009 | Cummings | F01N 1/088 60/274 |
| 8,220,442 | B2 | 7/2012 | Caldwell | |
| 8,246,704 | B2 | 8/2012 | Brock et al. | |
| 2003/0121722 | A1 * | 7/2003 | Crombeen | F01N 1/089 181/275 |
| 2006/0277901 | A1 | 12/2006 | Allegre et al. | |
| 2011/0296808 | A1 * | 12/2011 | Brock | B01D 45/16 55/459.1 |
| 2012/0125300 | A1 | 5/2012 | Caldwell | |
| 2012/0255808 | A1 | 10/2012 | Brock et al. | |
| 2014/0260211 | A1 | 9/2014 | Patchett et al. | |
| 2014/0293732 | A1 | 10/2014 | Ohtsuki et al. | |

* cited by examiner

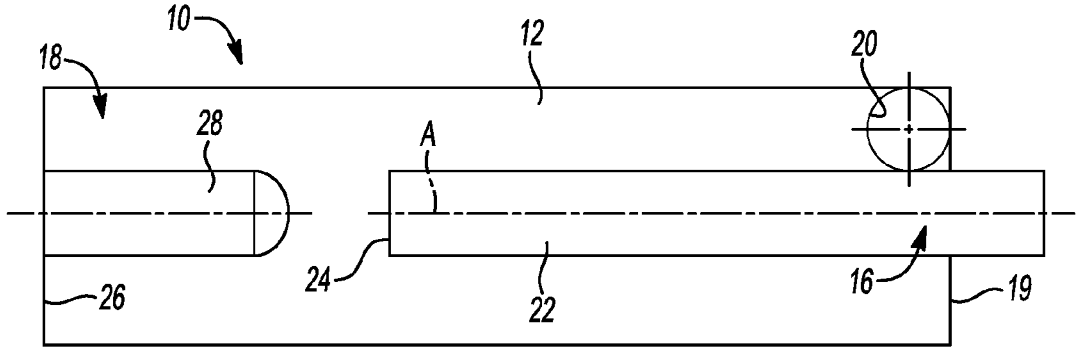
Fig-1
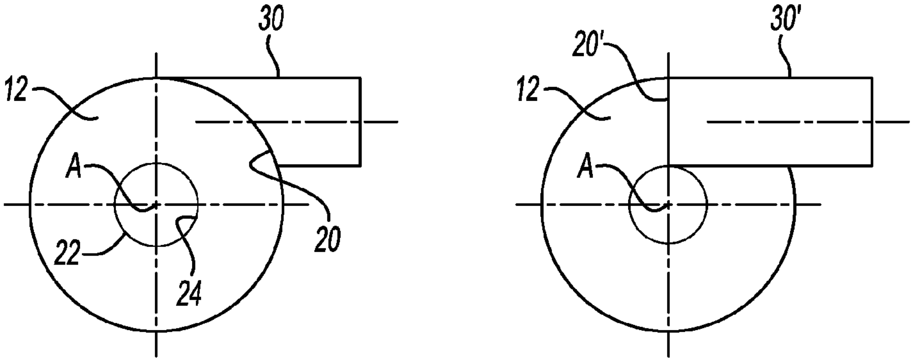
Fig-2A
Fig-2B
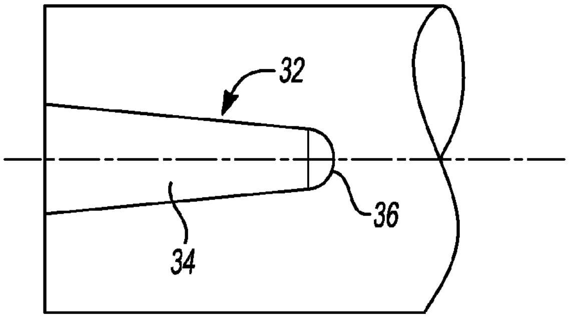
Fig-3

VORTEX FLOW APPARATUS

CROSS-REFERENCE TO RELATED APPLICATIONS

This application claims the benefit of U.S. provisional application Ser. No. 61/993,702 filed May 15, 2014, the disclosures of which is hereby incorporated in its entirety by reference herein.

TECHNICAL FIELD

This disclosure relates to apparatus that create a contained vortex by directing fluid flow from at least one inlet into a housing and out of the housing through at least one outlet.

BACKGROUND

A vortex flow apparatus includes a container for a fluid that flows in a swirling circular path. Particle separators are one example of a known use for vortex flow apparatus. Another proposed use is as a muffler for an external combustion or an internal combustion engine which may be a spark ignition engine or a compression ignition engine. When used as a muffler, the kinetic energy of the flowing gases and thermal energy and the amplitude of acoustic or aerodynamic oscillations is modified including sound, ultrasound and infrasound waves. The apparatus reduces sound entering the container from the inlet and when implemented as a muffler reduces sound or noise emanating from the combustion engine.

Applicants' assignee is the owner by assignment of U.S. Pat. No. 8,246,704 that issued on Aug. 21, 2012 and is entitled "Contained Vortices Device" and U.S. Pat. No. 8,409,312 that issued on Apr. 2, 2013 and is entitled "Muffler." In the course of developing the above inventions many alternative embodiments have been conceived by applicants that may provide additional benefits or may be used in an effort to circumvent the scope of the claims in the above patents.

This application is directed to protecting alternative embodiments that applicants have conceived and that applicants may develop and test in the future.

SUMMARY

The vortex flow apparatus disclosed in this application converts (or partially converts) the kinetic energy of the flowing fluid, thermal energy, and acoustic energy into other forms of energy. Conversion of the energy may result in sound reduction and may also produce other physical and chemical reactions. The vortex flow in the apparatus may undergo an abrupt change in the swirling flow described as vortex breakdown, vortex implosion, vortex bubble or various other descriptions for this abrupt vortex change. Interaction of acoustics and vortex flow may also produce acoustic streaming or steady streaming or pulsed streaming within the device and may result in sound reduction, may improve energy conversion and may affect particle separation and may transport particles to pressure node locations and may provide localized micro-mixing and may provide micro-actuation and may provide micro-manipulation for small particles and may also produce other physical and chemical reactions.

When used as a muffler with a combustion engine, sound levels are reduced over substantially the entire engine operating range. The dimensions and arrangement of the component parts of the vortex flow apparatus when used as a muffler may be adjusted to tune the sound emanating from the apparatus. The apparatus may be adjusted for a specific application due to engine exhaust flow properties, exhaust system dimensions, the location of the muffler, the orientation (vertical or horizontal), and the size of the muffler.

The apparatus also produces low pressure within the apparatus that is advantageous when implemented as an engine exhaust muffler and is particularly advantageous for turbocharged engines. The length of the apparatus, relative position of the inlet, outlet and internal projection may be adjusted to reduce pressure to a greater or lesser extent. Sound attenuation and pressure performance may be balanced or tuned for specific applications. The configuration of the apparatus may also be adjusted for particle separation and spark suppression. When used as a muffler on a vehicle it is desirable that no particles accumulate inside the muffler but that particle size is reduced and that the particles flow from the apparatus.

Depending upon the configuration of the apparatus when used as a muffler, the temperature of the fluid flowing from the muffler may be different than the fluid flowing from a conventional muffler. The low back pressure of the muffler results in changes in engine performance and fuel combustion and may result in higher engine exhaust temperature. High exhaust temperatures may result in improved catalytic conversion and particle combustion. The apparatus when used as a muffler may also reduce NOx and CO and emissions and reduce unburned hydrocarbons and particles carried by the exhaust gas. In addition, combustibles are prevented from exiting the apparatus and no spark ignition occurs at the outlet.

The vortex flow in the apparatus results in a reflected counter vortex flow that is an abrupt vortex direction change that creates a low pressure region. Energy conversion occurs as a result of the kinetic energy, thermal energy, and acoustic energy interactions that result in sound reduction and other changes in the exhaust gas.

According to one aspect of this disclosure, the vortex flow is induced at an inlet by the fluid being directed by tangential entry or flow directing vanes to swirl around the inside of the cylindrical or conical housing. Alternatively, entry may parallel or be angled to the apparatus axis with induced vortex by a vane or plurality of vanes. The vortex flow reverses at the opposite end from the inlet and in the vicinity of the tip of a projection that creates a counter-rotating flow. A region of abrupt change vortex flow and low pressure is created proximate the tip of the projection and between the projection and an outlet tube through which the fluid flows out of the apparatus. The flow diverges and energy and particles are converted differently at this low pressure region than at other locations within the device.

According to one aspect of this disclosure, an apparatus is disclosed that comprises a cylindrical or conical housing having a central axis, a first end and a second end. An inlet opening into the first end of the housing is located proximate a first end wall. An outlet tube defining an outlet opening extends from inside the housing and through the first end wall. A projection attached to a second end wall of the housing extends into the housing. The following descriptions represent an inlet circular diameter "d" or an equivalent circular diameter "d" for other inlet geometries. The inlet can have various geometries other than circular, such as oval, elliptical, square, rectangular, triangular, trapezoidal, polygonal, etc. The size of the openings may be equivalent to the cross-sectional area of a circular opening having a diameter "d" for the other shapes used to determine the size of non-circular inlet geometries. The outlet tube and projection are aligned with and centered relative to the central axis, and the inlet opening has a diameter "d" and the spacing between the end of the projection and the outlet tube is between 0.5 d and 2 d.

According to other aspects of this disclosure the spacing between the projection and the outlet tube may be 1.2 d. The housing may have a diameter of between 2.5 d and 3.5 d. The housing may have a diameter of 3 d. The outlet tube and the projection may have a diameter of between 0.5 d and 1.5 d. The outlet tube and the projection may have a diameter of "d". The inlet opening may be formed by a tube having a length of at least 1 d extending outwardly from the housing if the inlet tube extends into the housing. The inlet opening may be formed by a tube that may be flush with the housing side wall or may have a length of up to 1.5 d that extends inwardly into the housing. The outlet tube may have a length of at least 1 d extending outwardly from the housing. The projection may have a length of between 1 d to 5 d. The distance between bullet and exit may be from about 0.5 d to 2 d. In addition, the housing may have a length from 6 d to 12 d depending on the exhaust application. Small vehicle exhaust systems may require a shorter length while other applications may require a longer length. In one example, the housing had a length of 10.5 d.

According to another aspect of this disclosure, a contained vortex apparatus is disclosed that includes a projection is attached to a second end wall of the housing and extends into the housing that may take several forms. The projection shape for an exhaust muffler can be adjusted and tuned for pressure, acoustic reduction, and particle separation. For example, the projection may have a sidewall that is shaped as:

- a frustum of a cone with a convex partially spherical end;
- a cone;
- a cylindrical side wall that has a plurality of protruding circumferential frusto-conical ribs with a convex partially spherical end;
- a cylindrical side wall that has a protruding helical rib with a convex partially spherical end;
- a cylindrical side wall with a flat end;
- a recessed concave partially spherical end;
- a cylindrical side wall with a protruding conical end; or
- a cylindrical side wall with a protruding pointed end.

According to another aspect of this disclosure, a contained vortex apparatus is disclosed that includes a projection attached to a second wall of the housing that extends into the housing. An internal housing end may take several forms that may result in vortex reflection and acoustic reflection. For example, the projection and second wall internal housing end can be adjusted and tuned for pressure reduction, acoustic reduction, and particle separation when used as an exhaust muffler.

According to another aspect of this disclosure, a contained vortex apparatus is disclosed that includes a projection attached to a second wall of the housing and extends into the housing from an internal housing end that may take several forms. For example, the projection may be attached to a housing inside end shaped as:

- an angular oriented end;
- an inwardly conical end wall;
- an outwardly conical end wall;
- a partially spherical end wall;
- a partially spherical concave end wall;
- a spirally shaped inwardly conical end wall; or
- a spirally shaped inwardly spherical end wall.

According to another aspect of this disclosure, a contained vortex apparatus is disclosed that comprises a cylindrical or conical housing that defines an inlet opening. The inlet opening opens into the first end of the housing proximate a first end wall. The housing may further comprise a sidewall in that defines the inlet opening. Alternatively, the first end wall of the housing may define one or more inlet openings. A vane or plurality of vanes may be disposed in the inlet opening that induces a vortex within the housing.

According to another aspect of this disclosure, a vortex flow apparatus is disclosed that comprises a cylindrical or conical housing having a first end and a second end. A secondary chamber may be provided on the housing at the second end that defines openings through a second end wall to provide fluid flow from inside the housing to the secondary chamber. Openings are provided in the projection inside the secondary chamber to provide fluid flow from the secondary chamber into the projection.

According to other aspects of the apparatus described in the preceding paragraph, the projection may define a second plurality of openings in the end of the projection and inside the housing that provide fluid flow from inside the projection to the inside of the housing. The projection may also define a secondary outlet to provide fluid flow to a secondary outlet in an end of the projection outside the secondary chamber and the inside of the housing. The projection may define a port that extends from outside the secondary chamber through the secondary chamber and into the inside of the housing through the end of the projection. The port may be an inlet port or an outlet port. The inlet may receive exhaust gases from a combustion engine and the port may function to direct exhaust gases from inside the housing to the combustion engine for exhaust gas recirculation. The apparatus may further comprise a valve in fluid flow communication with the port that controls the flow of exhaust gases to the combustion engine.

According to another aspect of this disclosure, a contained vortex apparatus is disclosed that comprises a cylindrical housing having a side wall that has a plurality of ribs that extend helically around the housing. An outlet tube defines an outlet opening that extends from inside the housing and through the first end wall.

According to other aspects of the apparatus described in the preceding paragraph, the side wall may further comprise an inner wall having a smooth cylindrical surface attached to the inside surface of the side wall. In an alternative embodiment, the side wall may further comprise an inner wall having a smooth cylindrical surface attached to the inside of the side wall, and an outer wall having a smooth cylindrical surface attached to the outside surface of the side wall.

According to another aspect of this disclosure, a contained vortex apparatus is disclosed that includes a cylindrical housing that has a side wall that includes annular ribs that are spaced along the length of the housing. According to another aspect of this embodiment, the ribs may be in the shape of a sine wave with the length of the sine wave being adjusted and tuned to modify internal flow, acoustic waves, pressure, and particle separation. According to other aspects of this embodiment, the ribs may be tuned and adjusted depending on vortex rotational velocity, vortex axial velocity, and acoustic energy waves contained within the apparatus.

According to another aspect of this disclosure, a contained vortex catalytic converter is disclosed that may interact with the fluid inertia and abrupt vortex change and thermal energy and acoustic energy to produce reduction catalytic action and oxidation catalytic action with the device. The catalytic materials may be applied to various geometries and surfaces within the device and adjusted or tuned for the vortex flow and abrupt vortex change and temperature and acoustic properties to produce catalytic conversion as an emission control device. The catalytic converter may be disposed within a cylindrical housing having a first end and a second end. The contained vortex apparatus may also be a combined muffler and exhaust gas catalytic converter device. As an exhaust muffler and catalytic converter apparatus, the device may be implemented with a control system that monitors the exhaust and uses this information to control the fuel and air-to-fuel ratio entering the combustion process. The housing defines an inlet opening that opens into the first end of the housing proximate a first end wall. The housing has a side wall that includes a reduction phase coating applied to an inner surface of a side wall of the housing and an oxidation phase coating applied to the inner surface of the side wall spaced from the reduction phase coating. An outlet tube defines an outlet opening that extends from inside the housing and through the first end wall. The catalytic converter embodiment may also include a second reduction phase coating may be applied to an outer surface of the outlet tube and a second oxidation phase coating may be applied to the outer surface of the outlet tube. The reduction phase coating and the second reduction phase coating may be applied adjacent the inlet opening and upstream relative to the oxidation phase coating and the second oxidation phase coating. The oxidation phase coating may be applied to the inner surface outboard of the outlet tube.

According to another aspect of this disclosure, a contained vortex apparatus is disclosed that includes a projection attached to a second end wall of the housing and extending into the housing that is formed at least partially of a magnetic material to produce a magnetic field that functions to apply a magnetic charge to fluid and gas and particles within the housing. The magnetic charge cooperates with the energy conversion and acoustic streaming phenomenon to magnetically process particles in the apparatus. The contained vortex apparatus may be a combined muffler and magnetic field device. An insulator may be disposed between the projection and the second end wall. The magnetic material may be a permanent magnet inserted inside the projection.

According to another aspect of this disclosure, a vortex flow apparatus is disclosed that comprises a cylindrical housing that includes an ultrasonic energy generator that is disposed to create ultrasonic energy within the cylindrical housing. The contained vortex apparatus may be a combined muffler and ultrasonic device. The ultrasonic generator may be disposed within the projection, on the housing, proximate the inlet opening, or proximate one of the ends of the housing. In one embodiment, the ultrasonic energy generator may be an ultrasonic whistle generator. The ultrasonic energy and waves may be utilized to alter vortex flow and turbulent flow, produce very high local pressure for various processing applications, produce very high local temperature, modify and separate agglomerated particles, modify fluids including gases, or act as a catalyst for chemical reactions. The ultrasonic energy cooperates with the energy conversion and acoustic streaming phenomenon to ultrasonically process particles in the apparatus. All of these and other effects of ultrasonic energy may have benefit when combined within the exhaust muffler embodiment.

According to another aspect of this disclosure, a contained vortex flow apparatus is disclosed that is electrically connected to a voltage source. The contained vortex apparatus may be a combined muffler and electrical charge device. For example, the contained vortex flow apparatus may electrically charge fluid and gas and particles and ions within the device. The voltage source may produce ions within the housing, may electrically charge particulates within the housing, or may ionize particles suspended within the housing. The voltage source may be connected to the housing and the projection within the housing, or may be connected to the outlet pipe.

The voltage source may be connected to the housing and the projection within the housing. A needle shaped extension may be provided on an end of the projection that extends toward the outlet pipe. The extension may be electrically charged to generate ions within the housing proximate the extension. With regard to either of the electrically charged embodiments, electrical energy cooperates with the energy conversion and acoustic streaming phenomenon to process the electrically charged particles in the apparatus.

The above aspects of this disclosure and other aspects will be described in greater detail below with reference to the illustrated embodiments.

BRIEF DESCRIPTION OF THE DRAWINGS

FIG. 1 is a diagrammatic side cross-section view of a contained vortex apparatus illustrating dimensions of the apparatus.

FIG. 2A is a diagrammatic end cross-section view of the contained vortex apparatus illustrated in FIG. 1.

FIG. 2B is a diagrammatic end cross-section view of an alternative embodiment of a contained vortex apparatus that extends inwardly into the housing up to the centerline of the housing.

FIG. 3 is a fragmentary side cross-section view of an end of a contained vortex apparatus having a projection that is in the shape of a frustum of a cone with a convex partially spherical end.

DETAILED DESCRIPTION

Figure 4:
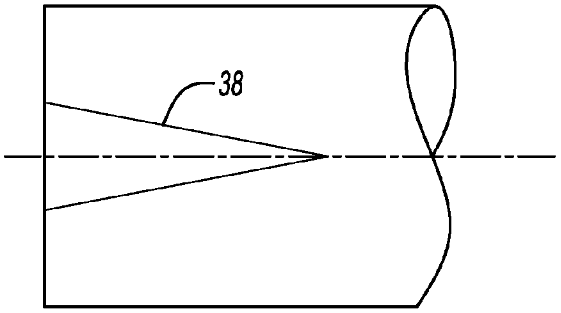
FIG. 4 is a fragmentary side cross-section view of an end of a contained vortex apparatus having a projection that is in the shape of a cone.

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Referring to FIGS. 1 and 2A, a vortex flow apparatus 10 is disclosed that comprises a cylindrical housing 12 having a central axis A, a first end 16 and a second end 18. The housing 12 defines an inlet opening 20 that opens into the first end 16 of the housing 12 proximate a first end wall 19. The inlet opening 20 may be defined by a tube that opens into the housing 12. The inlet opening 20 into the housing 12 may be flush with the side wall of the housing 12 or may extend up to half-way through the housing 12. An outlet tube 22 defining an outlet opening 24 that extends from inside the housing 12 and through the first end wall 19. A projection 28 attached to a second end wall 26 of the housing 12 extends into the housing 12. The outlet tube 22 and projection 28 are aligned with and centered relative to the central axis A. The inlet opening 20 has a diameter "d" that ranges from the smallest engine exhaust diameter to the largest engine exhaust diameter. The exhaust diameter and the muffler inlet diameter are based on engine displacement, back pressure for a particular engine, how many exhaust pipes (1 or 2), location of the muffler, and other features of the specific vehicle as well as required engine and acoustic performance. Exhaust piping and muffler inlet diameters are adjusted and tuned to the specific engine application. The spacing between the end of the projection 28 and the outlet tube 22 may be between 0.5 d and 2 d. In one embodiment, the spacing between the projection 28 and the outlet tube is 1.2 d.

The housing 12 may have a diameter of between 2.5 d and 3.5 d. In one embodiment the housing 12 has a diameter of 3 d. The outlet tube 22 and the projection 28 may have a diameter of between 0.5 d and 1.5 d. In one embodiment, the outlet tube 22 and the projection 28 may have a diameter of "d".

The inlet opening 20 may be formed by a tube 30 having a length of at least 3 d extending outwardly from the housing 12. The outlet tube 22 has a length of at least 1 d extending outwardly from the housing 12. As previously described, the tube 30 may also extend inside the housing 12 so that it is flush with the housing 12 or up to 1.5 d into the housing 12.

Referring to FIG. 2B, the housing 12 has an inlet opening 20' formed by a tube 30' having a length extending inwardly into the housing 12 up to the centerline (axis A) of the housing 12.

The housing 12 may have a length of between 6 d and 12 d. In one embodiment, the housing may have a length of 10.5 d.

Referring to FIG. 3, one end of a contained vortex apparatus is illustrated that has a projection 32 that has a frusto-conical sidewall 34 that is in the shape of a frustum of a cone with a convex partially spherical end 36.

Referring to FIG. 4, one end of a contained vortex apparatus is illustrated that has a conical projection 38 that is in the shape of a cone.

Figure 5:
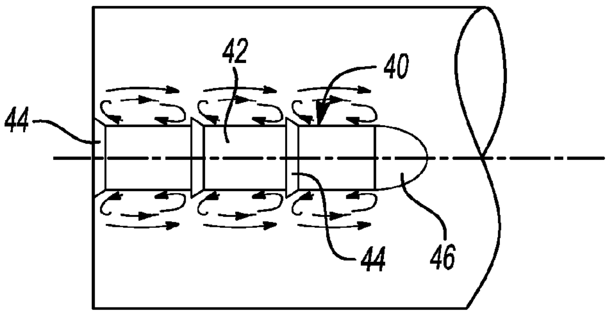
FIG. 5 is a fragmentary side cross-section view of an end of a contained vortex apparatus having a projection that has a cylindrical side wall that has three protruding circumferential frusto-conical ribs with a convex partially spherical end.

Referring to FIG. 5, an end of a contained vortex apparatus having a ribbed projection 40 that has a cylindrical side wall 42 that has one or more protruding circumferential frusto-conical ribs 44 with a convex partially spherical end 46.

Figure 6:
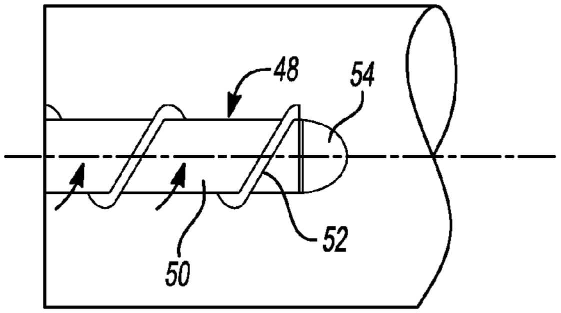
FIG. 6 is a fragmentary side cross-section view of an end of a contained vortex apparatus having a projection that has a cylindrical side wall that has a protruding helical rib with a convex partially spherical end.

Referring to FIG. 6, an end of a contained vortex apparatus having a helically ribbed projection 48 that has a cylindrical side wall 50 that has a protruding helical rib 52 with a convex partially spherical end 54.

Figure 7:
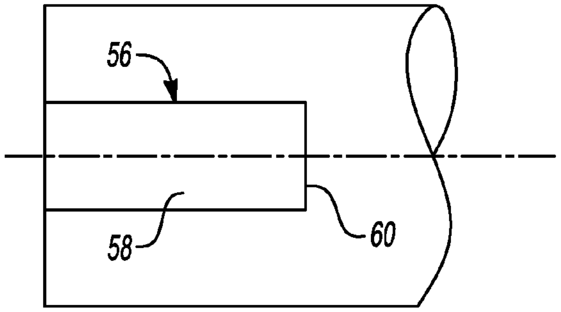
FIG. 7 is a fragmentary side cross-section view of an end of a contained vortex apparatus having a projection that has a cylindrical side wall with a flat end.

Referring to FIG. 7, an end of a contained vortex apparatus having a flat end projection 56 that has a cylindrical side wall 58 with a flat end 60.

Figure 8:
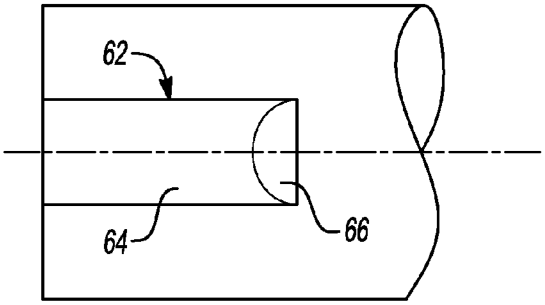
FIG. 8 is a fragmentary side cross-section view of an end of a contained vortex apparatus having a projection that has a cylindrical side wall with a concave partially spherical end.

Referring to FIG. 8, an end of a contained vortex apparatus having a concave ended projection 62 that has a cylindrical side wall 64 with a concave partially spherical end 66.

Figure 9:
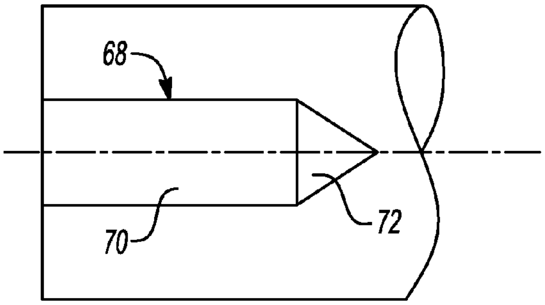
FIG. 9 is a fragmentary side cross-section view of an end of a contained vortex apparatus having a projection that has a cylindrical side wall with a concave partially spherical end.

Referring to FIG. 9, a conical end projection 68 that has a cylindrical side wall 70 with a conical end 72.

Figure 10:
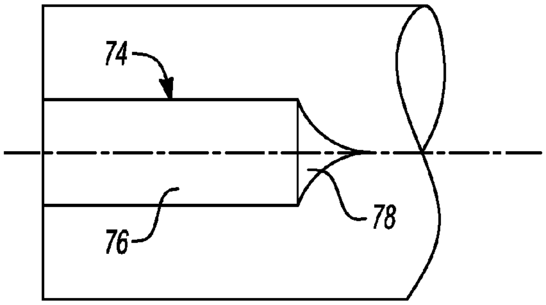
FIG. 10 is a fragmentary side cross-section view of an end of a contained vortex apparatus having a projection that has a cylindrical side wall with a pointed end.

Referring to FIG. 10, an end of a contained vortex apparatus having a pointed projection 74 that has a cylindrical side wall 76 with a pointed end 78.

Figure 11:
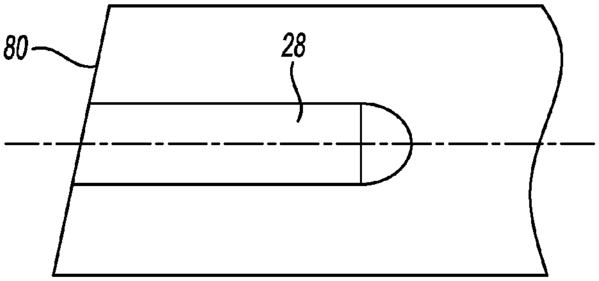
FIG. 11 is a fragmentary side cross-section view of an end of a contained vortex apparatus having an end wall supporting a projection that is a planar wall disposed at an angle offset from a transverse plane.
Figure 12:
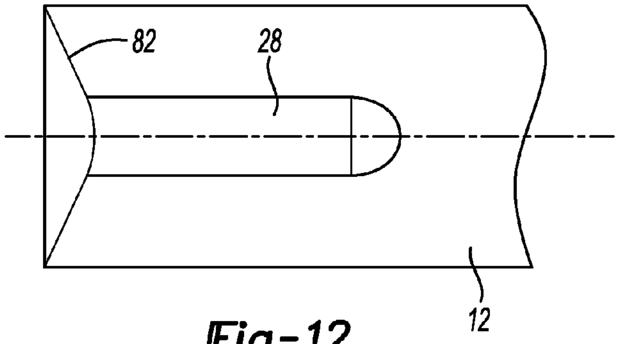
FIG. 12 is a fragmentary side cross-section view of an end of a contained vortex apparatus having an end wall supporting a projection that is a conical wall that extends into the housing.

Referring to FIG. 11, an end of a contained vortex apparatus having a angularly oriented end wall 80 supporting a projection 28 that is a planar wall disposed at an angle offset from a transverse plane;

Referring to FIG. 12, an end of a contained vortex apparatus having an inwardly conical end wall 82 supporting a projection 28 that is a conical wall that extends into the housing 12.

Figure 13:
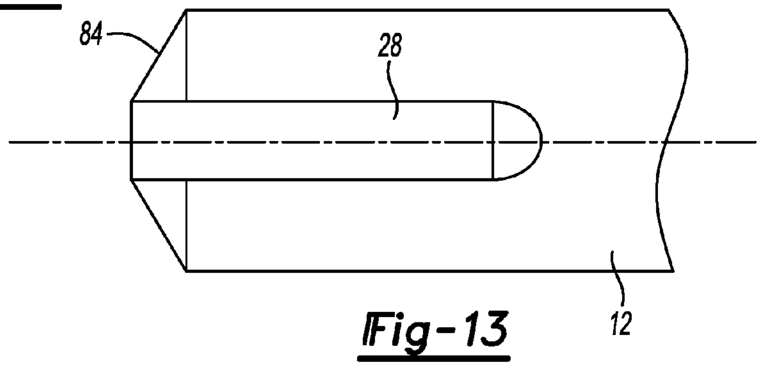
FIG. 13 is a fragmentary side cross-section view of an end of a contained vortex apparatus having an end wall supporting a projection that is a conical wall that protrudes from the housing.

Referring to FIG. 13, an end of a contained vortex apparatus having an outwardly conical end wall 84 supporting a projection 28 that is a conical wall that protrudes from the housing 12.

Figure 14:
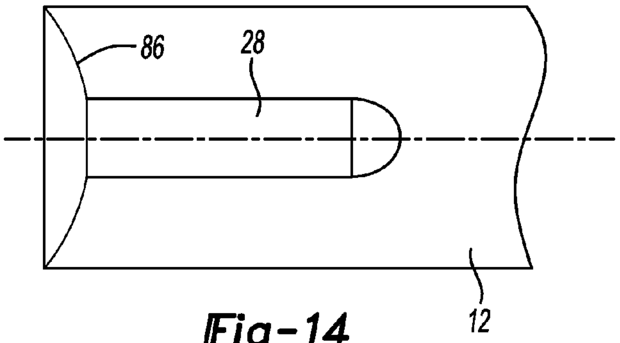
FIG. 14 is a fragmentary side cross-section view of an end of a contained vortex apparatus having an end wall supporting a projection that is a partially spherical convex wall that extends into the housing.

Referring to FIG. 14, an end of a contained vortex apparatus having a partially spherical end wall 86 supporting a projection 28 that is a partially spherical convex wall that extends into the housing 12.

Figure 15:
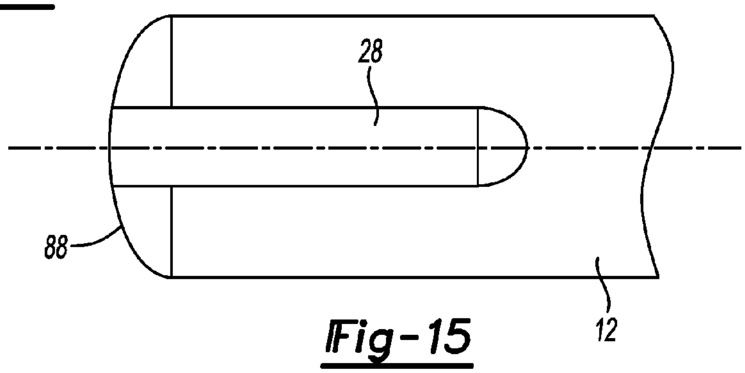
FIG. 15 is a fragmentary side cross-section view of an end of a contained vortex apparatus having an end wall supporting a projection that is a partially spherical concave wall that protrudes from the housing.

Referring to FIG. 15, an end of a contained vortex apparatus having a partially spherical concave end wall 88 supporting a projection 28 that is a partially spherical concave wall that protrudes from the housing 12.

Figure 16:
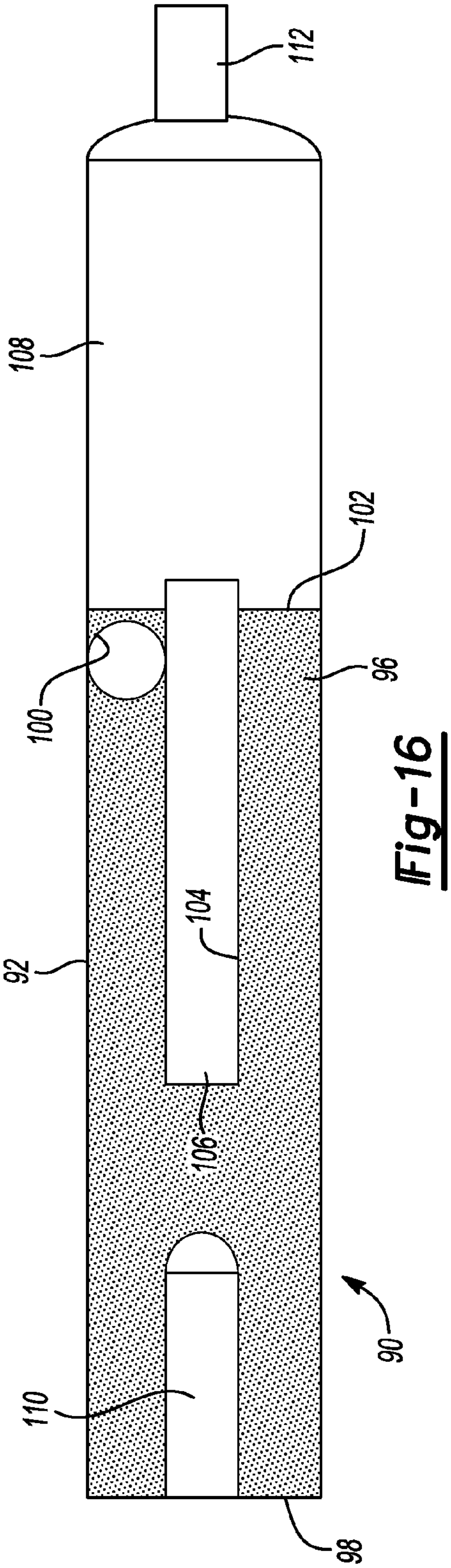
FIG. 16 is a diagrammatic side cross-section view of a contained vortex apparatus that includes a chamber outside the live end for tuning the sound emanating from the apparatus.

Referring to FIG. 16, a vortex flow apparatus 90 is disclosed that comprises a cylindrical housing 92 having a first end 96 and a second end 98. The housing 92 defines an inlet opening 100 that opens into the first end 96 of the housing 92 near a first end wall 102. An outlet tube 104 defines an outlet opening 106 that extends from inside the housing 92 and into a resonance chamber 108. Projection 110 extends into the housing 92 and is attached to the second end wall 98. The outlet tube 104 and projection are aligned with each other and are centered relative to each other. The resonance chamber 108 further comprises an outlet tube 112 that allows the exhaust gases to flow from the resonance chamber 108. The dimensions of the resonance chamber 108 may be adjusted and tuned to obtain the desired acoustic performance. The location, shape and configuration of the inlet 100 and protrusion 110 are adjusted to tune the muffler to obtain the desired acoustic output.

Figure 17:
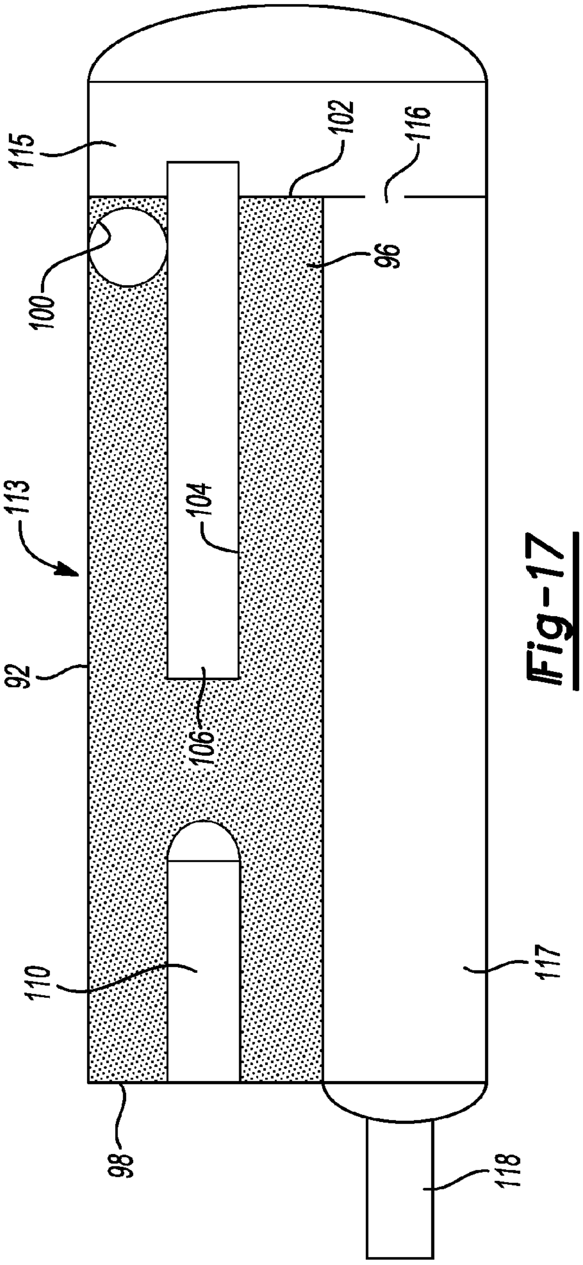
FIG. 17 is a diagrammatic side cross-section view of an alternative embodiment of a contained vortex apparatus that includes a chamber on one side of the apparatus for tuning the sound emanating from the apparatus.
Figure 18:
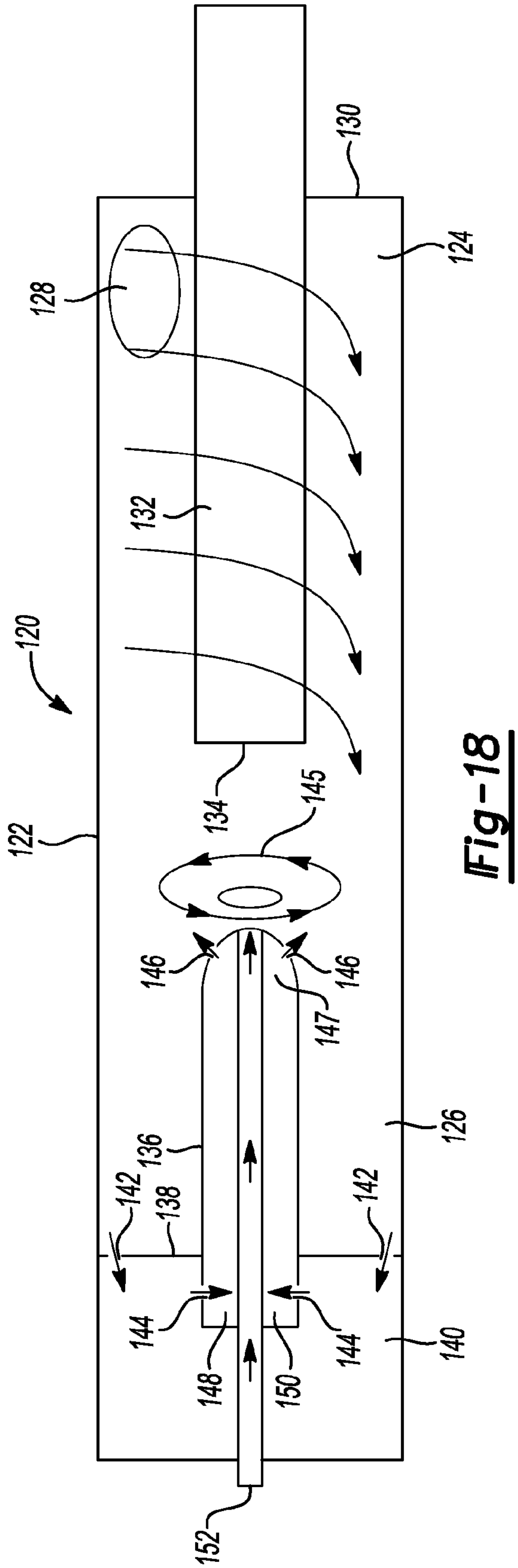
FIG. 18 is a diagrammatic side cross-section view of a contained vortex apparatus that includes a chamber that is external to the housing of the vortex apparatus that has openings for receiving particulates and fluid flow from the housing and also includes an inlet in the projection for supplying fluid into the housing.

Referring to FIG. 17, another alternative embodiment of a muffler including a resonance chamber is generally indicated by reference numeral 113. Exhaust gases are received from an internal or external combustion engine through the inlet 100. The gases flow in a circular vortex around the housing initially between the housing and the outlet tube 104 from the first end 96 toward the second end 98. The vortex flow is interrupted in the area between the projection 110 and the outlet tube 104. The gases then flow through the opening 106 in the outlet tube 104 and into a chamber 115. The chamber 115 is provided on a first end 96 and receives the exhaust gases from the outlet opening 106. Exhaust gases flow from the chamber 115 and into a second resonance chamber 117 that is arranged parallel to the cylindrical housing 92. A port 116 is provided between the chamber 115 and the reversing chamber 117. The volume and shape of the chamber 115 is adjustable to facilitate connection of the vortex flow apparatus 113 to the chamber 115. Chamber 117 includes an outlet 118 that is on the opposite end of the vortex flow apparatus 113 from the inlet 100.

The dimensions of the chamber 117 are adjustable to allow for acoustic tuning of the muffler to provide the desired acoustic output. The inlet 100 receives exhaust gases and is on the first end 96 of the housing 92 while the outlet 118 is advantageously located adjacent to the second end 98 of the chamber 92. In this embodiment, the location of the inlet 100 and outlet 118 are analogous to conventional muffler designs in which the exhaust gases flow from the front end of the conventional muffler to the back end of the muffler that is arranged in a horizontal front to rear flow orientation.

Figure 19:
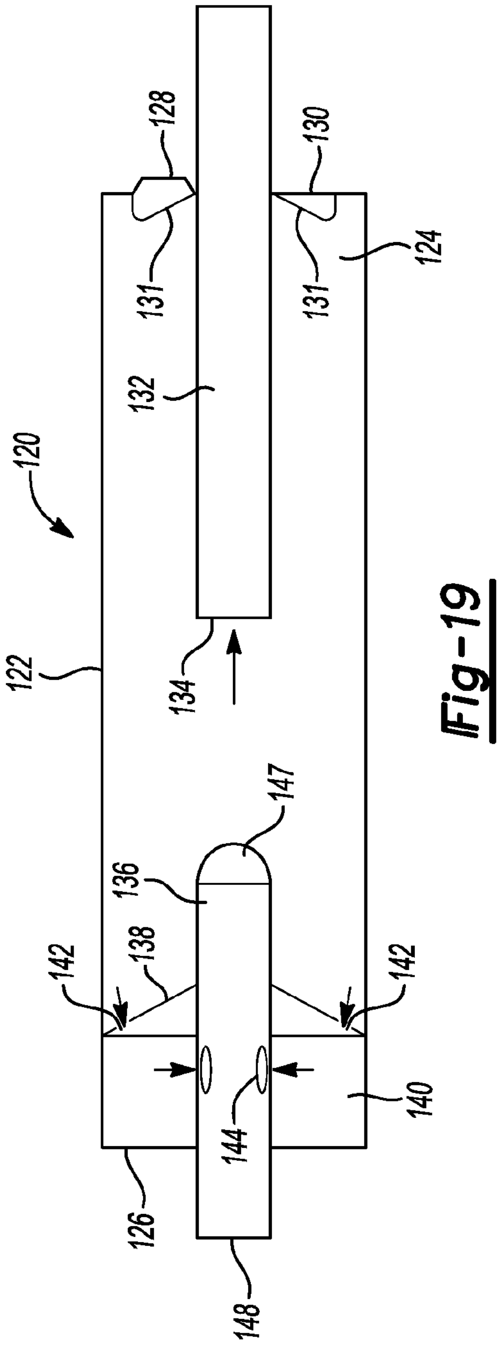
FIG. 19 is a diagrammatic side cross-section view of a contained vortex apparatus that includes a chamber that is external to the housing of the vortex apparatus that has openings for receiving particulates and fluid flow from the housing and also includes openings in the projection to provide a secondary outlet from the housing and chamber.
Figure 20:
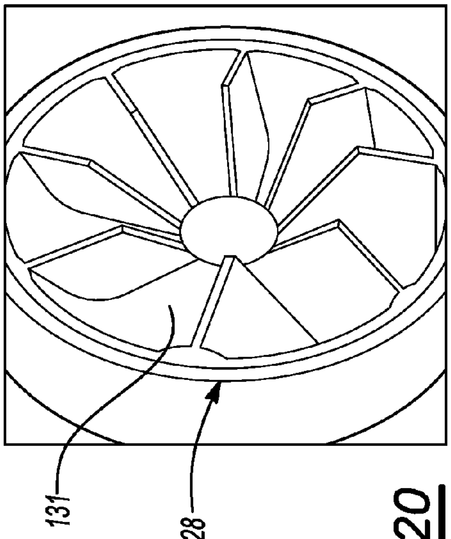
FIG. 20 is a fragmentary perspective view of a set of vanes on an inlet end wall of the contained vortex apparatus of FIG. 19.
Figure 21:
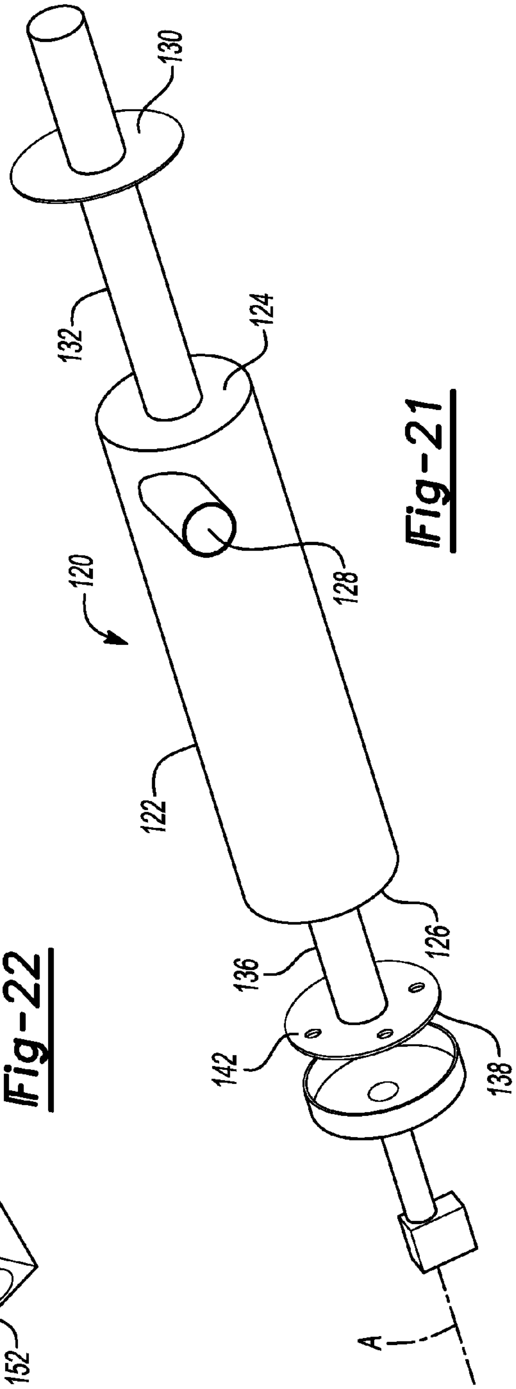
FIG. 21 is an exploded perspective view of a contained vortex apparatus that includes a chamber that is external to the housing of the vortex apparatus that has openings for receiving particulates and fluid flow from the housing and also includes openings in the projection to provide a secondary outlet from the housing and chamber to provide exhaust gas recirculation.
Figure 22:
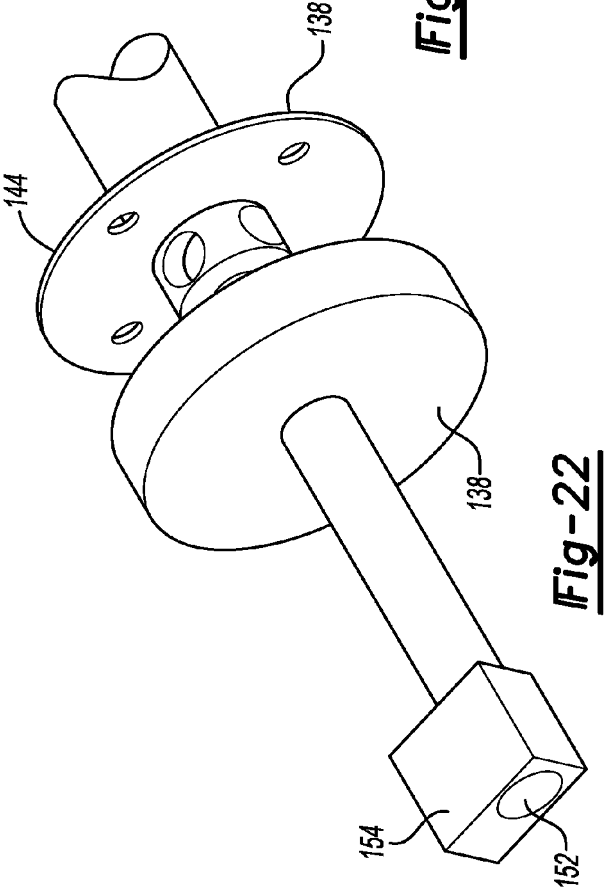
FIG. 22 is an enlarged view of part of the apparatus shown in FIG. 21 including the wall defining the openings and the exhaust gas recirculation valve.

Referring to FIGS. 18-22, a vortex flow apparatus 120 is illustrated that comprises a cylindrical housing 122 having a central axis A, a first end 124 and a second end 126, wherein the housing 122 defines an inlet opening 128, that opens into the first end 124 of the housing 122 through a first end wall 130. Referring to FIGS. 19 and 20, the inlet opening 128 may be provided with a plurality of vanes 131 that direct the flow of gases in a circular vortex around the inside of the housing 122. An outlet tube 132 defines an outlet opening 134 that extends from inside the housing 122 and through the first end wall 130. A projection 136 is attached to a second end wall 138 of the housing 122 and extends into the housing 122, wherein the outlet tube 132 and projection 136 are aligned with and centered relative to the central axis. A secondary housing 140 defines a chamber on the housing 122 at the second end 126. The second end wall 138 defines openings 142 that provide fluid flow from inside the housing 122 to the secondary chamber 140. The projection 136 defines openings 144 that provide fluid flow from the secondary chamber 140 into the projection 136. An area of low pressure or reversing vortex flow is indicated by the circular arrow 145 between the projection 136 and the outlet tube 132.

According to other aspects of this disclosure relating to the embodiment described in the preceding paragraph, the projection 136 may define a second plurality of openings 146 in the inside end 147 of the projection 136 and inside the housing 122 that provide fluid flow from inside the projection 136 to the inside of the housing 122. The projection 136 may define a secondary outlet 148 that provides fluid flow to an outer end 150 of the projection. The projection 136 may define a port 152 that extends from outside the secondary chamber 140 through the secondary chamber 140 and into the inside of the housing 122 through the inside end 147 of the projection 136. The port 152 may function as an inlet or an outlet. The inlet opening 128 to the housing 122 may receive exhaust gases from a combustion engine (not shown) and the port 152 may direct exhaust gases from inside the housing 122 to the combustion engine for exhaust gas recirculation. The apparatus may further comprise a valve 154 that is in fluid flow communication with the port 152 that controls the flow of exhaust gases to the combustion engine.

Figure 23:
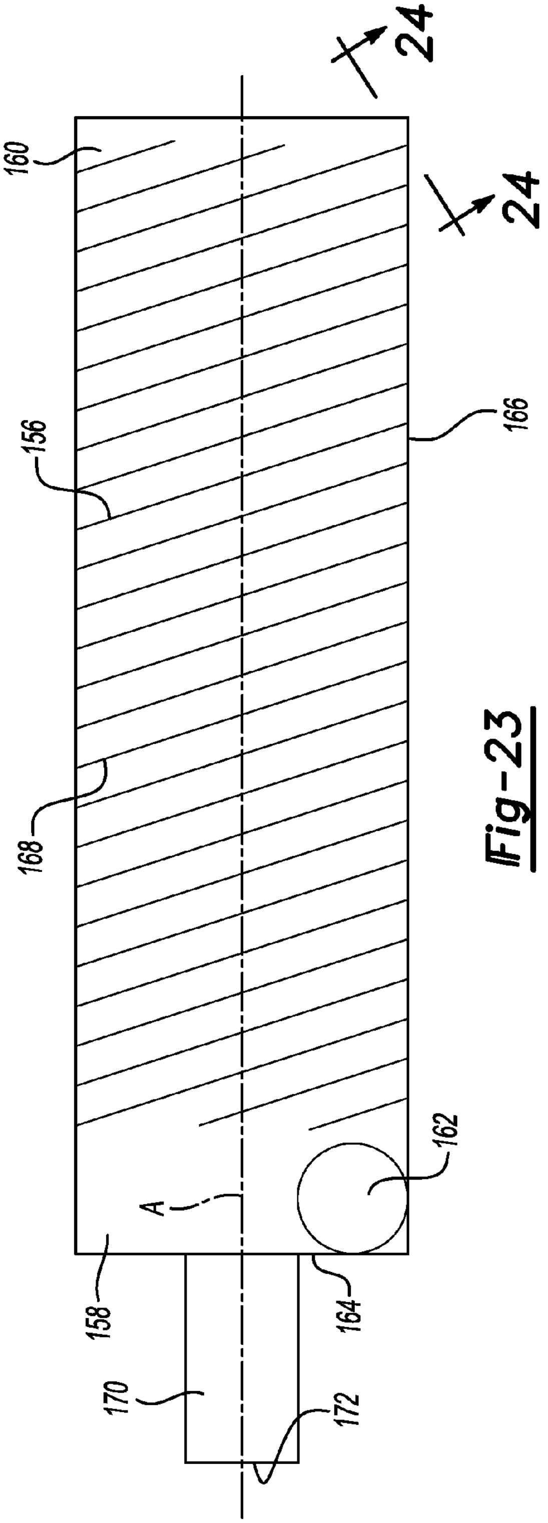
FIG. 23 is a diagrammatic side elevation view of a contained vortex apparatus that has a corrugated side wall.
Figure 24:
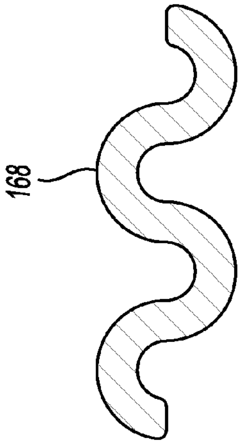
FIG. 24 is a fragmentary diagrammatic cross-section view taken along the line 24-24 in FIG. 23.

Referring to FIG. 23, a vortex flow apparatus is disclosed that comprises a cylindrical housing 156 having a central axis A, a first end 158 and a second end 160. The housing 156 defines an inlet opening 162. The inlet opening 162 opens into the first end 158 of the housing 156 proximate a first end wall 164. A side wall 166 is provided that has a plurality of ribs 168 that extend helically around the housing 156. An outlet tube 170 defines an outlet opening 172 that extends from inside the housing 156 and through the first end wall 164. Referring to FIG. 24, the ribs 168 in the sidewall are shown in cross-section.

Figure 25:
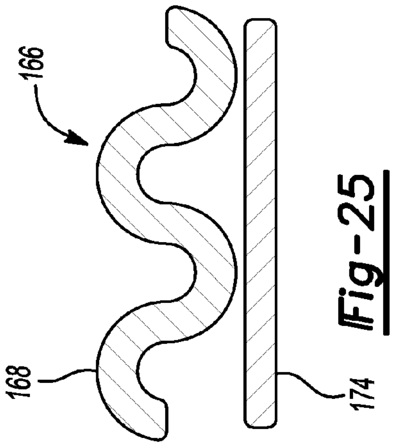
FIG. 25 is an alternative embodiment of a corrugated side wall taken from the same perspective as FIG. 24.

Referring to FIG. 25, an alternative embodiment of the side wall 166 is shown to further comprise an inner wall 174 having a smooth cylindrical surface attached to the inside surface of the side wall 166 that is formed with the ribs 168.

Figure 26:
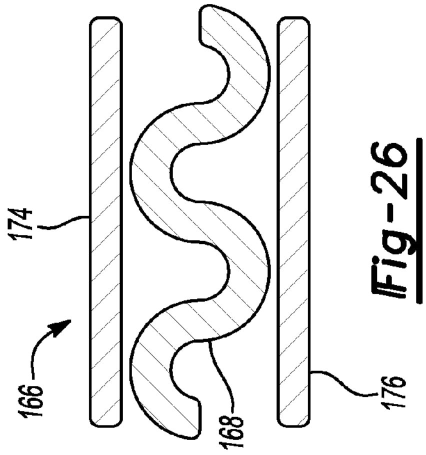
FIG. 26 is another alternative embodiment of a corrugated side wall taken from the same perspective as FIG. 24.

Referring to FIG. 26, another embodiment is shown further comprises an inner wall 174 having a smooth cylindrical surface attached to the inside of the side wall 166, and an outer wall 176 having a smooth cylindrical surface attached to the outside surface of the side wall 166.

Figure 27:
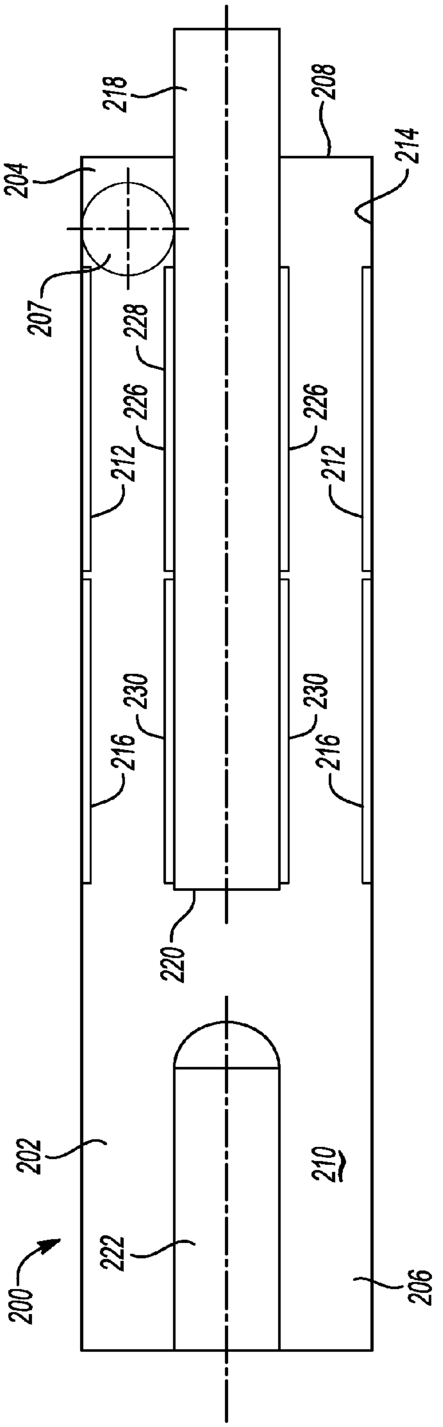
FIG. 27 is a diagrammatic side cross-section view of a contained vortex apparatus that has a side wall with a catalyst coating on an inside side wall of the housing that, as illustrated, includes a reduction coating and an oxidation coating for catalytically converting exhaust emissions.

Referring to FIG. 27, a catalytic converter embodiment of a contained vortex apparatus 200 is disclosed that includes a cylindrical housing 202 having a central axis, a first end 204 and a second end 206, wherein the housing 200 defines an inlet opening 207, and wherein the inlet opening 207 opens into the first end 204 of the housing 202 proximate a first end wall 208, and wherein the housing 202 has a side wall 210 that includes a reduction phase coating 212 applied to an inner surface 214 of the side wall 210 of the housing 202 and an oxidation phase coating 216 applied to the inner surface 214 of the side wall 210 spaced from the reduction phase 212 coating. An outlet tube 218 defining an outlet opening 220 that extends from inside the housing 202 and through the first end wall 208. A projection 222 is attached to a second end wall 224 of the housing 202 and extends into the housing 202, wherein the outlet tube 218 and projection 222 are aligned with and centered relative to the central axis.

A second reduction phase coating 226 may be applied to an outer surface 228 of the outlet tube 218 and a second oxidation phase coating 230 may be applied to the outer surface 228 of the outlet tube 218. The reduction phase coating 212 and the second reduction phase coating 226 may be applied adjacent to the inlet opening 206 and upstream relative to the oxidation phase coating 216 and the second oxidation phase coating 230. The oxidation phase coating 216 may be applied to the inner surface 214 outboard of the outlet tube 218.

Figure 28:
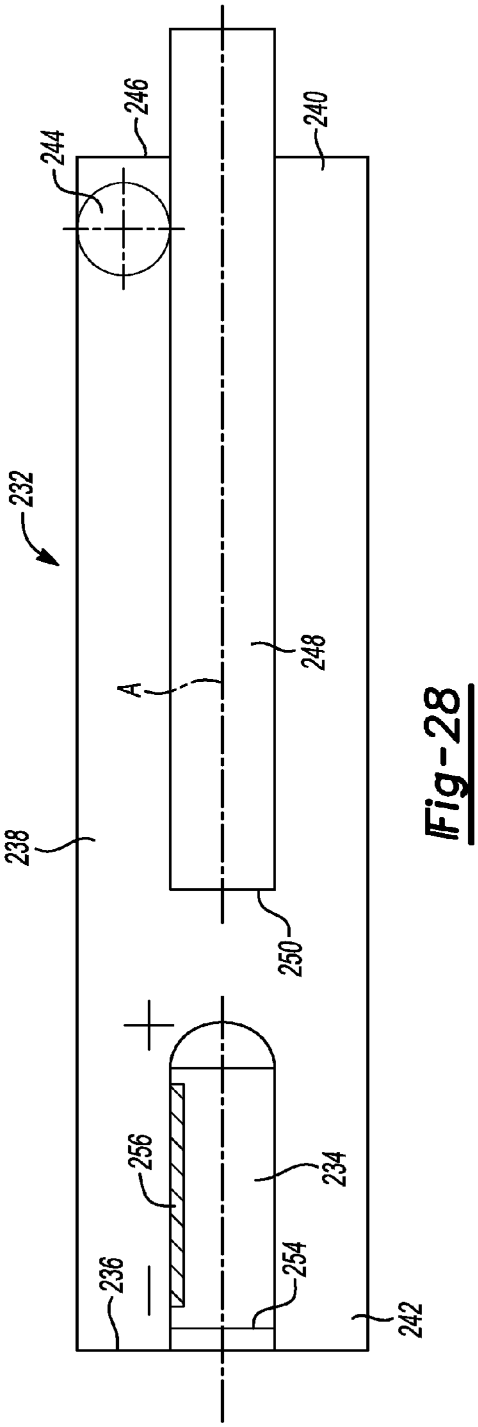
FIG. 28 is a diagrammatic side cross-section view of a contained vortex apparatus that has a magnetized protrusion attached to the second end of the housing.

Referring to FIG. 28, a contained vortex apparatus 232 is disclosed that includes magnetized projection 234 attached to one end wall 236. The apparatus 232 comprises a cylindrical housing 238 having a central axis, a first end 240 and a second end 242. The housing 238 defines an inlet opening 244 that opens into the first end 240 of the housing 238 proximate a first end wall 246. An outlet tube 248 defines an outlet opening 250 that extends from inside the housing 238 and through the first end wall 246. A projection 234 is attached to a second end wall 236 of the housing 238 and extends into the housing 238, wherein the outlet tube 248 and projection 234 are aligned with and centered relative to the central axis. The projection 234 is formed at least partially of a magnetic material to produce a magnetic field that functions to apply a magnetic charge to particles within the housing 238. An insulator 254 may be disposed between the projection 234 and the second end wall 236. The magnetic material may be a permanent magnet 256 inserted inside the projection 234.

Figure 29:
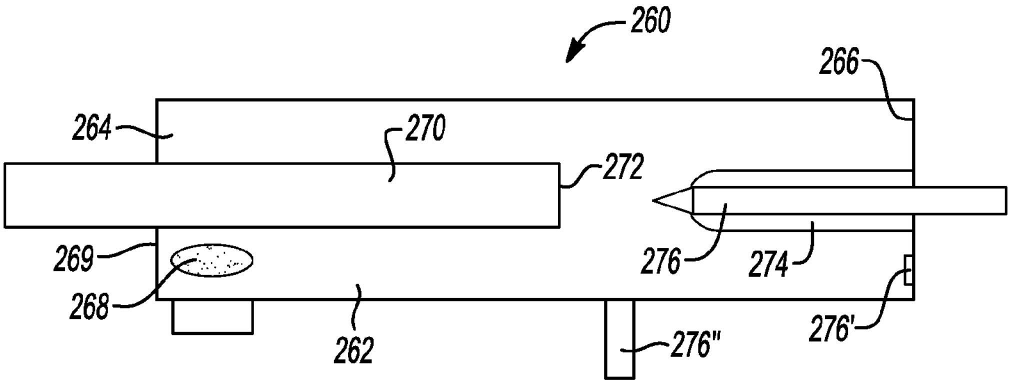
FIG. 29 is a diagrammatic side cross-section view of a contained vortex apparatus that includes an ultrasonic energy generating device.

Referring to FIG. 29, a vortex flow apparatus with an ultrasonic generator 260 is illustrated that comprises a cylindrical housing 262 having a central axis, a first end 264 and a second end 266. The housing 262 defines an inlet opening 268 that opens into the first end 264 of the housing 262 proximate a first end wall 269. An outlet tube 270 defines an outlet opening 272 that extends from inside the housing 262 and through the first end wall 269. A projection 274 is attached to a second end wall 266 of the housing 262 and extends into the housing. The outlet tube 270 and projection 274 are aligned with and centered relative to the central axis. An ultrasonic energy generator 276 is disposed to generate ultrasonic energy within the cylindrical housing 262.

According to other aspects of this disclosure as it relates to the ultrasonic generator embodiment 260, the ultrasonic energy generator 276 may be disposed within the projection 274. Alternatively, an ultrasonic generator 276' may be disposed on the end wall 266 or an ultrasonic generator 276" may be disposed on the housing 262. Other potential locations that may be provided with an ultrasonic generator that are not illustrated include locations proximate the inlet opening 268 or proximate the other one of the end 264 of the housing 262. The ultrasonic energy generator 276 may be of the type that may be referred to as an ultrasonic whistle generator.

Figure 30:
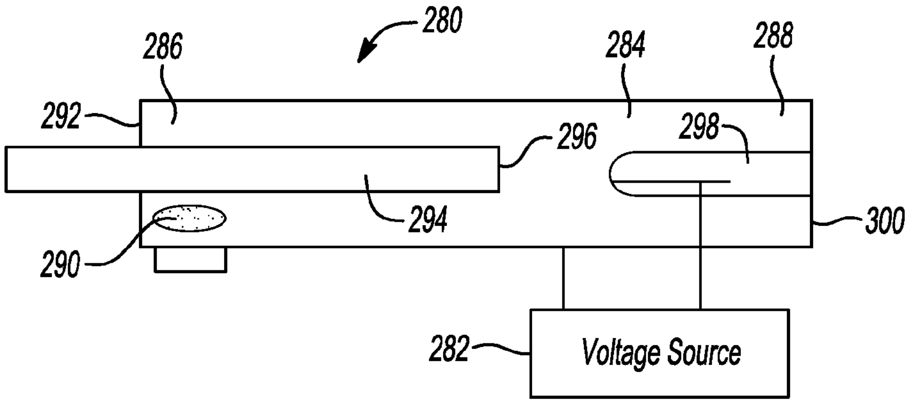
FIG. 30 is a diagrammatic side cross-section view of a contained vortex apparatus that includes a voltage source attached to the apparatus.

Referring to FIG. 30, a contained vortex flow apparatus 280 is disclosed that is electrically connected to a voltage source 282. The electrically charged vortex flow apparatus 280 comprises a cylindrical housing 284 having a central axis, a first end 286 and a second end 288. The housing 284 defines an inlet opening 290 that opens into the first end 286 of the housing 284 proximate a first end wall 292. An outlet tube 294 defines an outlet opening 296 that extends from inside the housing 284 and through the first end wall 292. A projection 298 is attached to a second end wall 300 of the housing 284 and extends into the housing 284. The outlet tube 294 and projection 298 are aligned with and centered relative to the central axis. The voltage source 282 is electrically connected to the apparatus 280.

According to other aspects of this disclosure as it relates to the electrically charged apparatus 280, the voltage source 282 may produce ions within the housing 284, may electrically charge particulates within the housing 284, or may ionize particles suspended within the housing 284. The voltage source 282 is connected to the housing 284 and the projection 298 within the housing 284, or may be connected to the outlet tube 294.

Figure 31:
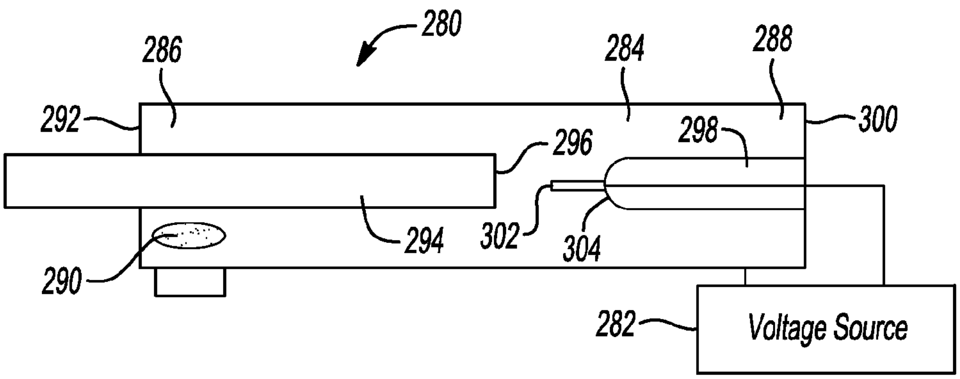
FIG. 31 is a diagrammatic side cross-section view of a contained vortex apparatus that includes a voltage source and an electrically charged needle attached to the projection of the apparatus.

Referring to FIG. 31, the voltage source 282 may be connected to the housing 284 and the projection 298 within the housing 284, and further may comprise a needle shaped extension 302 provided on an end 304 of the projection 298 that extends toward the outlet tube 294. The extension 302 may be electrically charged to produce electrical ions within the housing 284 proximate the extension 302.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. An apparatus comprising:

a cylindrical housing having a central axis, a first end and a second end, wherein the housing defines an inlet opening, and wherein the inlet opening opens into the first end of the housing proximate a first end wall, and wherein the housing has a side wall that includes a reduction phase coating applied to an inner surface of a side wall of the housing and an oxidation phase coating applied to the inner surface of the side wall spaced from the reduction phase coating;

an outlet tube defining an outlet opening that extends from inside the housing and through the first end wall; and a projection attached to a second end wall of the housing and extending into the housing, wherein the outlet tube and projection are aligned with and centered relative to the central axis.

2. The apparatus of claim 1 further comprising a second reduction phase coating applied to an outer surface of the outlet tube and a second oxidation phase coating applied to the outer surface of the outlet tube.

3. The apparatus of claim 2 wherein the reduction phase coating and the second reduction phase coating are adjacent the inlet opening and upstream relative to the oxidation phase coating and the second oxidation phase coating.

4. The apparatus of claim 3 wherein the oxidation phase coating is applied to the inner surface outboard of the outlet tube.

* * * * *